US006913457B2

(12) United States Patent  (10) Patent No.: US 6,913,457 B2
Penfornis et al.  (45) Date of Patent: Jul. 5, 2005

(54) METHOD AND APPARATUS FOR OPTIMIZED CO POST-COMBUSTION IN LOW $NO_X$ COMBUSTION PROCESSES

(75) Inventors: Erwin Penfornis, Levallois-Perret (FR); Ovidiu Marin, St. Cloud (FR); Rajani Varagani, Lombard, IL (US); M. Usman Ghani, Bolingbrook, IL (US)

(73) Assignee: American Air Liquide, Inc., Fremont, CA (US)

(*) Notice: Subject to any disclaimer, the term of this patent is extended or adjusted under 35 U.S.C. 154(b) by 0 days.

(21) Appl. No.: 10/808,255

(22) Filed: Mar. 24, 2004

(65) Prior Publication Data

US 2005/0026097 A1 Feb. 3, 2005

Related U.S. Application Data

(60) Provisional application No. 60/491,220, filed on Jul. 30, 2003.

(51) Int. Cl.[7] .................................. F23C 5/00
(52) U.S. Cl. ........................................... 431/8
(58) Field of Search ................. 431/4, 5, 8, 9, 431/10, 158, 351; 60/732, 752

(56) References Cited

U.S. PATENT DOCUMENTS

| | | | |
|---|---|---|---|
| 3,873,671 A | 3/1975 | Reed et al. | |
| 4,033,725 A | 7/1977 | Reed et al. | |
| 4,583,936 A | 4/1986 | Krieger | |
| 4,819,438 A | * 4/1989 | Schultz | 60/730 |
| 4,846,665 A | 7/1989 | Abbasi | |
| 5,285,628 A | 2/1994 | Korenberg | |
| 5,302,111 A | 4/1994 | Jouvaud et al. | |
| 5,356,213 A | 10/1994 | Arpentinier | |
| 5,522,721 A | 6/1996 | Drogue et al. | |
| 5,882,618 A | * 3/1999 | Bhatia et al. | 423/376 |
| 6,109,911 A | 8/2000 | Tamminen et al. | |
| 6,659,636 B1 | * 12/2003 | Matula | 366/165.1 |
| 6,718,772 B2 | 4/2004 | Dalla Betta et al. | |

FOREIGN PATENT DOCUMENTS

| | | |
|---|---|---|
| CA | 2349060 | 11/2001 |
| DE | 4006735 | 9/1991 |
| DE | 4117364 | 12/1992 |
| DE | 93 06 924 | 12/1993 |
| DE | 19619919 | 5/1996 |
| EP | 0593045 | 10/1993 |
| EP | 0850884 | 12/1997 |
| EP | 0962704 | 5/1999 |
| EP | 1139022 | 3/2001 |
| WO | WO 94 15148 | 7/1994 |
| WO | WO 02 097327 | 12/2002 |

OTHER PUBLICATIONS

Oil & Gas Our Solutions from www.us.airliquide.com dated Feb. 20, 2003.*
Advances in Combustion Technologies for Glass Processes GMIC Workshop in Pittsburgh dated May 2, 2000.*
International Search Report for PCT/IB2004/001944.
Patent Abstracts of Japan; vol. 0070, No. 59 (M–199), Mar. 11, 1983, & JP 57 204709 (Takuma Sougou Kenkyusho:KK, Dec. 15, 1982.

* cited by examiner

*Primary Examiner*—Stephen Gravini
(74) *Attorney, Agent, or Firm*—Linda K. Russell (57) ABSTRACT

An improved process for burning a fuel to produce a flue gas is disclosed. The fuel is burned in a main combustion zone in the presence of a main combustion oxidant to produce combustion products. The combustion products are mixed in a post-combustion zone positioned downstream from the main combustion zone. The post-combustion zone is provided with a recirculation zone positioned proximate to the main combustion zone and an injection zone positioned downstream from the recirculation zone. An post-combustion oxidant is injected into the combustion products in the injection zone. At least one of (a) the residence time of the combustion products in the post-combustion zone, (b) the temperature range of the combustion products contained within the injection zone and (c) the oxygen content of the oxidant is controlled to optimize the level of CO and $NO_x$ in the flue gas.

31 Claims, 9 Drawing Sheets

METHOD AND APPARATUS FOR OPTIMIZED CO POST-COMBUSTION IN LOW $NO_x$ COMBUSTION PROCESSES

CROSS REFERENCE TO RELATED APPLICATION

This application claims the benefit of U.S. Provisional Application No. 60/491,220, filed Jul. 30, 2003.

BACKGROUND OF THE INVENTION

1. Field of the Invention

This invention relates to a method for optimized post-combustion of CO and unburned hydrocarbons in combustion processes where low levels of $NO_x$ emissions are to be achieved.

2. Related Art

High-temperature, natural gas-fired furnaces, especially those fired with preheated air, produce significant quantities of nitrogen oxides ($NO_x$) per unit of material processed. At the same time, regulations on emissions from industrial furnaces are becoming increasingly more stringent, especially in areas such as California.

Consequently, there has been a demand for improved combustion technologies allowing reduction of $NO_x$ formation. Different solutions have been developed, usually based on the principle of either staged or diluted combustion. However, the operating conditions that favor the reduction of $NO_x$ emissions typically affect the combustion process itself such that combustion can become incomplete, thereby generating carbon monoxide (CO) and unburned hydrocarbons (HC). For this reason, and in order to achieve optimum emission performances, some of the low $NO_x$ technologies have had to be coupled with some sort of post-combustion system in order to remove CO and unburned HC from the flue gas before being exhausted into the atmosphere.

The present invention relates to industrial combustion processes, including high-temperature furnaces, industrial boilers, and utility boilers, facing stringent $NO_x$ regulations. Because nitrogen oxides (primarily NO and $NO_2$, hereafter $NO_x$) have been identified as a major cause of air pollution as well as a significant health hazard in ambient air, they have been defined as a criteria pollutant by the Clean Air Act Amendment (CAAA), which has established environmental limits in determined locations.

To comply with these regulations, many U.S. combustion process operators have had to implement $NO_x$ control technologies in the past few years. This trend will most likely propagate in other areas and become even more pronounced.

Widely implemented low $NO_x$ technologies included combustion techniques, allowing to significantly prevent the formation of $NO_x$ inside the combustion chamber, in contrast to post-treatment techniques (such as Selective Catalytic Reduction), where $NO_x$ is removed from flue gases through chemical reactions. Among these combustion-based $NO_x$ control technologies, many different techniques have been proposed and optimized, based on the following concepts: 1) reduction of the temperature in the combustion zone to limit $NO_x$ formation mechanism, 2) decrease of the oxygen concentration available for $NO_x$ formation in the high temperature zones, and/or 3) creation of conditions under which $NO_x$ can be reduced to molecular nitrogen by reacting with hydrocarbon fragments.

One example of this general type of technology is low excess air, or reducing the available oxygen to the point which is just sufficient to oxidize the fuel but not so much as to cause emissions such as $NO_x$, and CO (i.e. stoichiometric balance). Another example is staged combustion, or staging combustion by arranging the inlets of fuel or air to achieve off-stoichiometric firing conditions in the different zones of combustion. Still another example is flue gas recirculation (FGR), or recirculating the flue gas to the combustion zone as a diluent to reduce flame temperature and oxygen concentration. Another example is oscillating combustion, or oscillating the flow of fuel in order to create fuel-rich and fuel-lean combustion zones, and operating only under off-stoichiometric conditions. A final example is gas reburning, or introducing fuel gas to burn in the post combustion zone, generating hydrocarbon fragments which reduce the $NO_x$ formed in the main combustion zone to molecular nitrogen.

Advantageous as the foregoing examples can be, they each suffer some drawbacks. When applied to minimize $NO_x$ production, these examples can affect the mixing of the reactants, generating instability in the combustion process, and eventually causing incomplete combustion. The result is the unwanted exhaust of CO and unburned hydrocarbons from the combustion system. This can be explained by the fact that CO and unburned hydrocarbon formation is dependent on the same three basic factors that influence $NO_x$ emissions: temperature, oxygen concentration and residence time at elevated temperatures. Unfortunately, each of these must be controlled in the opposite direction from that of $NO_x$ reduction: if all three factors are decreased, $NO_x$ production can be dramatically reduced but CO production is enhanced, and vice versa.

As CO emissions can rarely be sacrificed for reduced $NO_x$ because low emission systems must keep both pollutants at a minimum, it is then necessary to implement a CO removal system downstream of the combustion region. Again two different approaches are basically available in the prior art: a first one, based on catalytic oxidation of CO in the flue gas exhaust section, at reduced temperature, and a second one, based on post-combustion of CO with an oxidant, inside or in the vicinity of the combustion chamber.

A well known catalytic method is the Non-Selective Catalytic Reduction (NSCR), used in rich burn engines for simultaneous reduction of $NO_x$, CO and volatile organic compounds. With this method, the engine is tuned to run richer so that there is a concurrent decrease in $NO_x$ and increase in reducing agents (CO and HC). Then downstream of the engine, in the presence of a catalyst and at reduced temperature, $NO_x$ react with CO, HCs or $H_2$ to produce nitrogen, carbon dioxide and water. If this method allows a combined reduction of the different pollutants, it can however be quite expensive, with the need for a tight process control system and a costly catalytic reactor that has to be replaced periodically. A similar system for gas-fired heating units is also presented in German Patent DE 4006735, issued to Ragert.

Thus, a problem associated with high-temperature CO removal methods that precede the present invention is that they do not provide a post-combustion system including at least one, and preferably a combination, of a flue gas recirculation zone, a flue gas mixing zone and an oxidant injection zone.

Still another problem associated with high-temperature CO removal methods that precede the present invention is that they do not provide a method that sufficiently increases the residence time of combustion products inside the combustion chamber, especially in regions where temperature is low enough to prevent the formation of $NO_x$.

Another problem associated with high-temperature CO removal methods that precede the present invention is that they do not provide enhancement of the mixing of combustion products inside the combustion chamber in order to favor the completion of the combustion.

An even further problem associated with high-temperature CO removal methods that precede the present invention is that they do not provide optimized post-combustion oxidant injection devices that distribute as evenly as possible this oxidant into the post-combustion zone.

For the foregoing reasons, there has been defined a long felt and unsolved need for a method for efficiently and cost-effectively removing CO and unburned HC from the flue gas of low $NO_x$ combustion processes without re-creating substantial $NO_x$ emissions.

SUMMARY OF THE INVENTION

A method for optimized post-combustion of CO and unburned hydrocarbons in combustion processes where low levels of $NO_x$ emissions are to be achieved is disclosed. The method is adaptable for use in many combustion processes, including industrial boilers, utility boilers and industrial furnaces. Through the proposed technique of post-combustion, CO emissions can be kept below regulated levels without regenerating additional $NO_x$ emissions. This post-combustion method is based on a combination of a recirculation zone of the combustion products, a flue gas mixing zone and finally, an oxidant injection zone, all designed to optimize the residence time, temperature range and mixing of the various reactants. In one preferred embodiment, this method and apparatus are associated with the technology of oscillating combustion, thus providing at the same time very low $NO_x$ emissions and CO emissions, in compliance with current regulations.

A previous application of the assignee, U.S. patent application Ser. No. 10/310,197, filed Dec. 3, 2002, describes a process using the technology of oscillating combustion to reduce $NO_x$ emissions, which usually involve the simultaneous implementation of a post-combustion device so as to keep CO emissions below compliance levels. Tests have shown that the fine-tuning of such post-combustion techniques is very complicated and much of the $NO_x$ reduction achieved at flame level can be spoiled in this area if CO is not burned out in an appropriate manner.

It is an object of the present invention to provide a post-combustion system including at least one, and preferably a combination, of a flue gas recirculation zone, a flue gas mixing zone and an oxidant injection zone.

Yet another object of the present invention to provide a method that sufficiently increases the residence time of combustion products inside the combustion chamber, especially in regions where temperature is low enough to prevent the formation of $NO_x$.

Still another object of the present invention to provide enhanced mixing of combustion products inside the combustion chamber in order to favor the completion of the combustion.

An even further object of the present invention to provide optimized post-combustion oxidant injection devices that distribute as evenly as possible this oxidant into the post-combustion zone.

These and other objects, advantages and features of the present invention will be apparent from the detailed description that follows.

BRIEF DESCRIPTION OF THE DRAWINGS

In the detailed description that follows, reference will be made to the following figures.

DESCRIPTION OF PREFERRED EMBODIMENTS

In a preferred embodiment, a method providing for optimal removal of CO in low $NO_x$ combustion process is disclosed. This method accomplishes two antagonist functions: burning out CO and unburned HC without generating additional $NO_x$ emissions. To achieve this result, three parameters are controlled. First, the residence time of the reactants in the post-combustion zone; second, the temperature at which the post-combustion is performed; and third, the completeness of mixing between the reactants.

Again referring to the preferred embodiment, a two-step method is disclosed. Since low $NO_x$ combustion techniques typically are run above stoichiometric conditions—i.e., with excess air—there is always some oxygen available in the combustion products, even if some CO and unburned HC are present. Therefore, the first step for reducing CO and unburned HC is to force the reaction between them and the still available oxygen before the exit of the combustion chamber. Then, if anything remains unburned, additional oxidant is injected to complete combustion.

Figure 1:
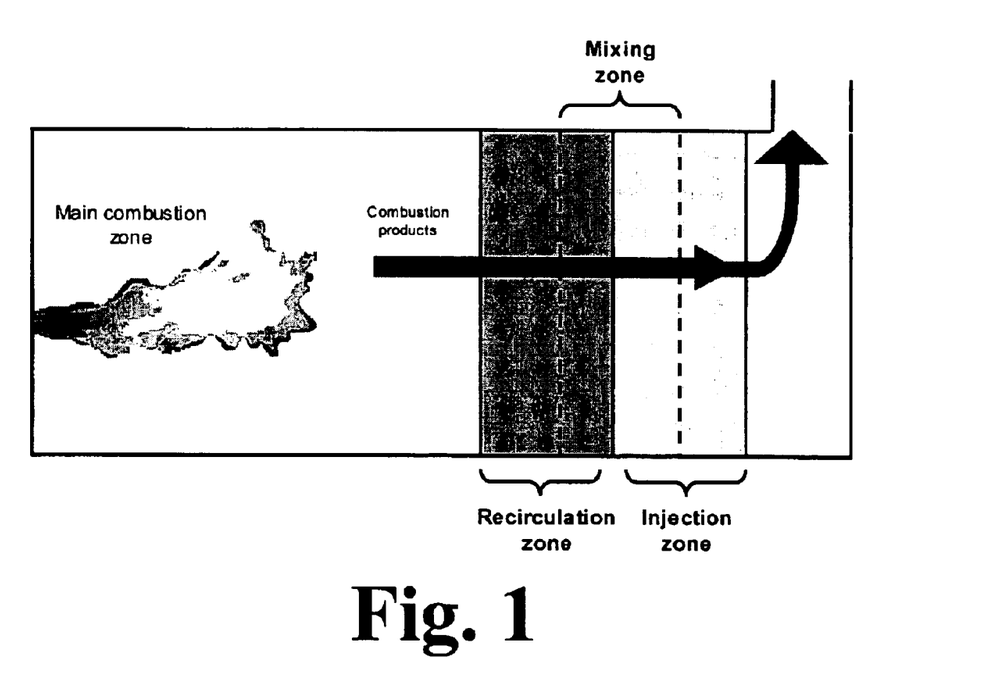
FIG. 1 is a schematic illustration of a preferred embodiment of a post-combustion process.

The post-combustion region is therefore partitioned into different zones, as shown in FIG. 1. The combustion products produced by the main combustion zone travel successively through a recirculation zone, a mixing zone and an injection zone. Note that, as illustrated, the mixing zone can overlap the recirculation zone and injection zone.

In the recirculation zone, the flue gases are recirculated, providing additional residence time as well as increasing the overall turbulence. Downstream of this zone, combustion products are then sent through a mixing zone where additional turbulence is generated, just before entering the final injection zone, where remaining CO and unburned HC meet with the post-combustion oxidant. Typically, in the first two zones, a portion of the CO and unburned HC can mix with available excess oxygen from the main combustion region and be removed, even without the need of additional oxidant.

At the same time, due to the increased residence time and turbulence, these first two zones allow for a homogenization of the overall combustion products flow, thus leading to a reduction of its peak temperature. This control of the temperature range in the post-combustion zone facilitates removal of CO without undue generation of $NO_x$. In a preferred embodiment, the post-combustion is performed in the temperature window between about 800° C. and 1300° C., and more preferably between 800° C. and 1100° C.

By using these two zones and positioning the overall post-combustion zone in the combustion chamber, CO is burned out in this temperature range and re-creation of $NO_x$ is substantially avoided. In a preferred embodiment, this post-combustion zone is positioned at the very end of the combustion chamber, in the vicinity of the outlet, since this location provides flue gas temperatures that are lowest and also provides the location where the entire flue gas flow is converging. However, depending on temperature levels encountered in various processes, the post-combustion system can be located elsewhere, e.g., either further inside the combustion chamber, or downstream, in the early section of the exhaust duct.

Having thus provided temperature range control in the first two zones, the combination of the mixing zone and the injection zone facilitates effective mixing of the post-combustion oxidant with the combustion products, thus allowing a fast CO burnout before the combustion chamber outlet and preventing $NO_x$ formation. Although in the preferred embodiment, these three different zones are placed in the described order, it is understood that other combinations of at least one of these zones can be effective.

Figure 2:
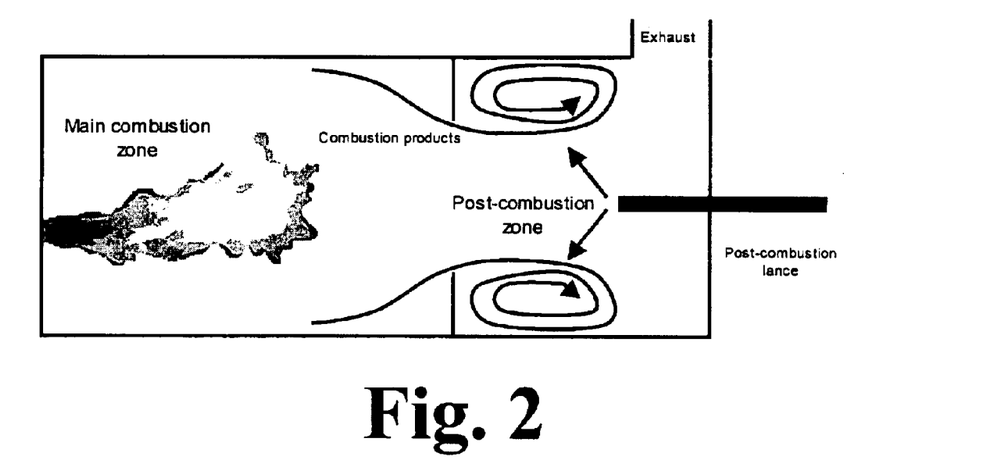
FIG. 2 is a schematic illustration of a preferred embodiment of a post-combustion process utilizing peripheral baffles.

Referring now to FIG. 2, a method for recirculating combustion products in the combustion chamber is shown. Baffles are installed on the chamber walls and oriented perpendicularly to the flow, to concentrate the flow in the center part of the chamber and to promote recirculation immediately downstream of the baffle, with the associated increase in residence time and turbulence.

Figure 3:
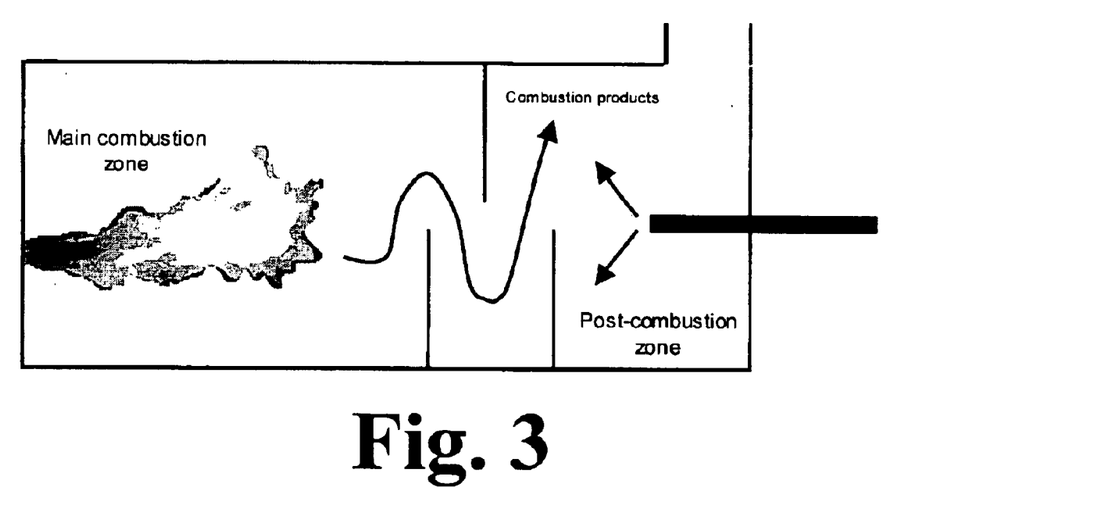
FIG. 3 is a schematic illustration of a preferred embodiment of a post-combustion process utilizing staggered baffles.

As shown in FIG. 3, staggered baffles are positioned successively at the bottom and at the top of the chamber, and are oriented perpendicularly to the flow. In both FIGS. 2 and 3, the number of baffles, their axial location and their size should be optimized case by case according to flow specifications, combustion chamber geometry, $NO_x$ and CO level. It should also be noted that various methods could be employed to implement these baffles in the combustion chamber: either fastened directly on the combustor walls, or fastened on an external body inserted through the combustor walls. These designs permit recirculation and also substantial mixing of the flue gas, thereby (a) promoting the reaction between CO and available excess oxygen, (b) reducing the peak temperatures encountered within the post-combustion chamber and (c) creating turbulent conditions for the subsequent mixing with post-combustion oxidant.

Figure 4:
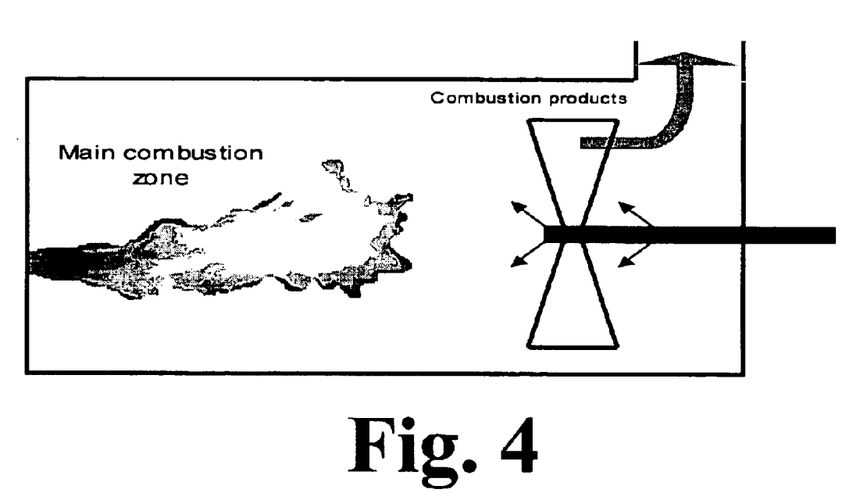
FIG. 4 is a schematic illustration of a preferred embodiment of a post-combustion process utilizing a diffuser design.

FIG. 4 shows the side view of a preferred embodiment constructed and arranged to enhance mixing and turbulence of the combustion products before the injection of post-combustion oxidant. This embodiment illustrates a diffuser, through which combustion products are forced to travel, thus generating a swirl pattern due to the orientation of the fins. This type of mechanical mixer can typically be mounted on the lances used for post-combustion injection. The number and orientation of the fins, as well as the relative position of such diffuser in relation to the recirculation and injection zones, are also to be adjusted case by case, according to process characteristics. It should be noted that different designs are possible to increase the mixing of combustion products, the bottom line being to disturb the flow and force it to change directions throughout its travel toward the exhaust of the combustion chamber.

Note that, in post-combustion oxidant injection, optimum mixing of the oxidant with the products of combustion so as to reach CO and unburned HC molecules as quickly as possible is preferred. Because the reaction time needed for the combustion of CO is on the order of a few milliseconds, the effectiveness of the CO removal is chiefly a matter of mixing. The better the mixing between the reactants, the closer to the end of the chamber can be located the injection system, thus allowing the post-combustion to happen in a region where the temperature is usually the lowest.

Post-combustion oxidant can be injected through one or more lances located in the region close to the combustion chamber exhaust and inserted through the combustor walls. The number of lances and the exact location of these injectors are also to be optimized according to specificities of the given applications, especially the size and geometry of the combustion chamber.

Figure 5:
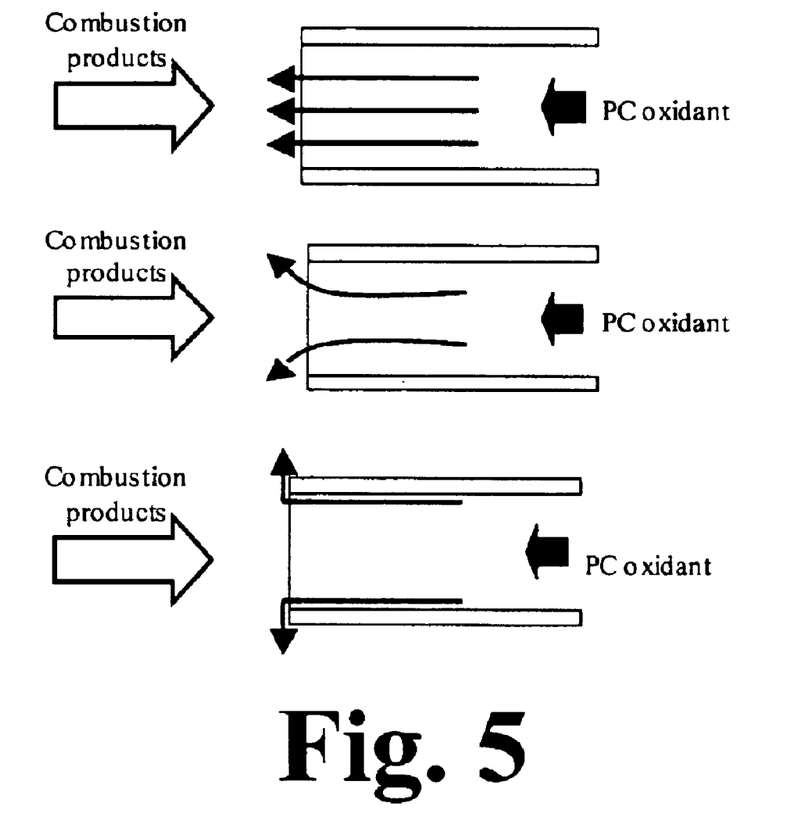
FIG. 5 is a schematic illustration of a preferred embodiment of a post-combustion process utilizing injection nozzles.

To optimize the mixing of the injected oxidant with CO and unburned HC, several injection nozzles can be provided, as shown by FIG. 5.

As seen in these drawings, in order to optimally combine with associated recirculation and mixing sub-systems, various injection directions are proposed: axially, facing the flow of combustion products; obliquely, with an angle between 0 and 90° compared to the flow or perpendicularly to the flow. The velocity is to be adjusted case by case, according to the type of nozzle and to the average velocity of the flue gas, preferably between 5 m/s and 120 m/s.

Figure 6:
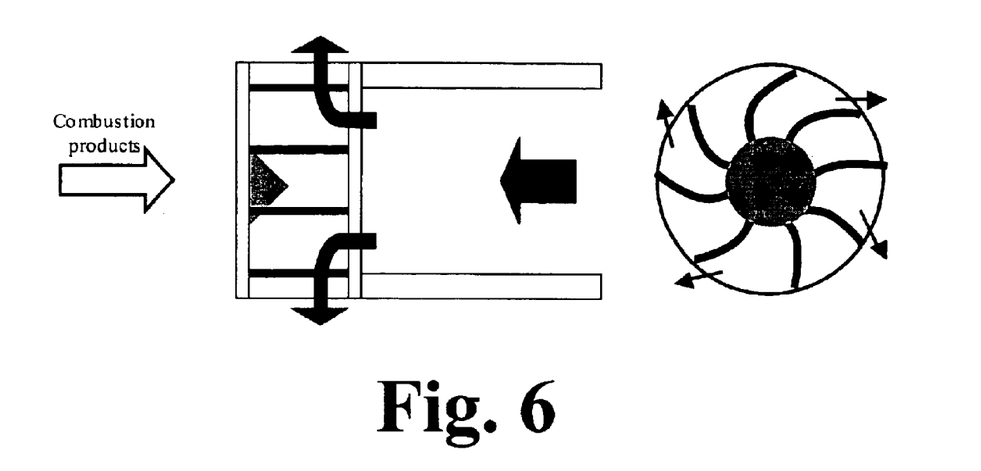
FIG. 6 is a schematic illustration of a preferred embodiment of a post-combustion process utilizing injection nozzles introducing swirl patterns.

Referring now to FIG. 6, injection is shown with a nozzle, the geometries of which are more fully shown in U.S. Pat. No. 5,356,213, the teachings of which are hereby incorporated by reference as if fully set forth herein. Injection of post-combustion oxidant is made perpendicularly to the flue gas flow with a unique swirl pattern, allowing the oxidant to reach and mix optimally with CO and unburned HC for effective burn out. This design can be employed with the diffuser system, for example downstream of it, and on the same injection lance, in such a manner that swirl patterns created by both systems (for the flue gas and for the oxidant) are rotating in opposite directions. With such a combination, high-quality mixing is then guaranteed between those reactants.

Figure 7:
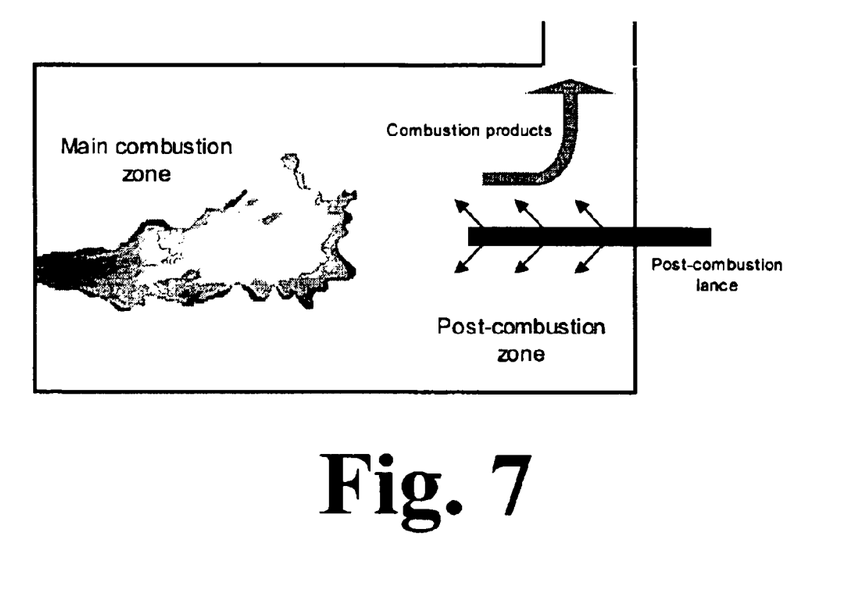
FIG. 7 is a schematic illustration of a preferred embodiment utilizing staged, post-combustion injection.

Another method for improving the mixing between combustion products and the post-combustion oxidant is shown in FIG. 7, and illustrates a staged and progressive injection of the oxidant along the injection lance. This way, the oxidant can be spread over a larger volume of flue gas and the heat released by the combustion of CO can be evenly distributed over a larger volume.

Specific materials can be selected for the implementation of recirculation, mixing and injection apparatus, to withstand the temperature ranges expected. Even when operated at relatively lower temperatures, e.g. between about 800° C. and 1100° C., material selection is important to withstand the thermal stresses. A preferred metal is Inconel, whose melting temperature is approximately around 1400° C. Ceramics can also be considered for such applications, as well as other materials selected to provide the appropriate high-temperature operability. Finally, water-cooled and air-cooled designs can be employed.

Various post-combustion oxidants can be selected according to the amount of CO to be removed and to the characteristics of the combustor. For example, one suitable oxidant is atmospheric air, which can preferably be blown through injection lances. For higher CO removal efficiency, oxygen enrichment of the post-combustion air can be performed. The additional oxygen injected maintains a chemically active atmosphere around the combustion products, and particularly around CO and unburned HC, which accelerates their combustion. This way, an even faster burn out of CO and unburned HC can be achieved. However, associated drawbacks include higher local heat release, due to the reduction of the ballast usually created by the nitrogen present in the air, and expense. The oxygen content in the post-combustion oxidant is maintained between 21% and 100%, but is preferably maintained between 21% and 35%, to avoid too high local heat releases.

To optimize the post-combustion of CO without re-creation of $NO_x$, through the implementation of means to lower and control the temperature in the post-combustion region, additional inert fluids can be injected into the post-combustion space along with the oxidant so as to create heat sinks that can absorb the heat released during the combustion of CO and unburned HC. These inert fluids include nitrogen, recirculated flue gas from the exhaust duct, carbon dioxide, water or steam. It is preferred to use fluids with high heat capacities, so water and steam are preferred heat sinks. Water is even more preferred since on top of its high heat capacity, its heat of vaporization when transformed into steam inside the combustion chamber constitutes and additional heat sink. Injection of inert fluids as heat sinks is particularly indicated when oxygen-enriched air or pure oxygen is used as post-combustion oxidant.

Thus, a post-combustion system which can be used as a combustion-staging device is provided. If the post-combustion system is optimized so that CO and unburned HC can be burnt out without production of additional $NO_x$, it is possible to reduce the stoichiometric ratio at the burner level (i.e., in the main combustion zone) to create fuel-rich conditions and thus to further prevent production of $NO_x$. The completion of the combustion is then achieved in the post-combustion zone through increased injection of oxidant. Preferably, the stoichiometric ratio at burner level is reduced below I and even more preferably between 0.7 and 1.

Another preferred embodiment provides the post-combustion method as disclosed herein in combination with low $NO_x$ technology of oscillating combustion. An example of oscillating combustion is shown in Applicant's co-pending U.S. patent application Ser. No. 10/310,197, filed Dec. 03 2002, entitled "Process and Apparatus of Combustion for Reduction of Nitrogen Oxide Emissions."

In an actual working example, performances were monitored, producing the following results. The technology of oscillating combustion (OCT) was implemented in a 100 HP natural gas-fired industrial boiler in order to reduce $NO_x$ emissions below levels required by some U.S. local authorities. From a baseline of 60 ppm of $NO_x$, the combustion technology (prior to utilizing the preferred embodiment) allowed to reduce $NO_x$ by more than 50%, but with concurrent formation of high amounts of CO and unburned HC. To burn out this CO and to keep its level below 400 ppm, post-combustion techniques were first implemented close to the outlet of the combustion chamber, based on the insertion of a lance through the boiler walls and the injection of post-combustion air. CO was then reduced significantly but not enough so as to be kept below compliance levels, and at the same time, some substantial amounts of $NO_x$ were re-created in this region, eventually leading to minor $NO_x$ reduction levels compared to the baseline without low $NO_x$ technology.

An optimized post-combustion system was then implemented, according to the teachings of this disclosure. A peripheral ring was installed inside the combustion chamber, close to the exhaust of this chamber (FIG. 2). A post-combustion lance was inserted downstream of this ring, fitted with a diffuser (FIG. 4) and a swirl-inducing nozzle (FIG. 6) located a few inches downstream of the diffuser. Finally, the post-combustion oxidant used was oxygen-enriched air, with an $O_2$ content of 30%. CO was effectively burned out and reduced below compliance levels, while $NO_x$ production levels were close to what was achieved without post-combustion.

The results of these different trials are compiled in Table 1, here below:

|  | OCT | OCT + Standard Post-combustion | OCT + Optimized Post-combustion |
| --- | --- | --- | --- |
| $NO_x$ reduction vs. baseline (60 ppm @ 3% O2) | 57% | 22% | 54% |
| CO (ppm @ 3% O2) | 13000 | 1700 | 280 |

An improved process for burning a fuel to produce a flue gas is disclosed. The fuel is burned in a main combustion zone in the presence of a main combustion oxidant to produce combustion products. The combustion products are mixed and the combustion reaction is substantially completed in a post-combustion zone positioned downstream from the main combustion zone. The post-combustion zone has a recirculation zone positioned proximate to the main combustion zone and an injection zone positioned downstream from the recirculation zone.

The post-combustion zone is provided preferably with at least one of a diffuser and a plurality of baffles oriented substantially perpendicular to the general direction of flow of the combustion products, disposed in staggered relation to one another. It is understood that these are provided to increase the residence time of gases within the respective chambers or zones. The temperature of the combustion products contained within the post-combustion zone is maintained between about 800° C. and about 1100° C.

A post-combustion oxidant is injected via one or several lances into the combustion products in the injection zone at an average velocity of between about 5 meters per second and about 120 meters per second. The stoichiometric amount of oxygen contained in the main oxidant is maintained between about 0.7 and 1.0 of the amount necessary for complete combustion. The total oxygen content of the post-combustion oxidant entering the oxidant chamber is maintained between 21% and 50%, and more preferably between 21% and 35%.

A heat-absorbing material can be injected into the post-combustion zone to further reduce the combustion temperature within this zone. The burning is conducted by oscillating combustion process techniques. At least one of (a) the residence time of the combustion products in the post-combustion zone, (b) the temperature of the combustion products contained within the injection zone and (c) the oxygen content of the oxidant is controlled to optimize the level of CO and $NO_x$ in the flue gas.

The post-combustion oxidant can preferably be injected into the combustion products in one of four specified ways: in axial, countercurrent relation to the direction of flow of the combustion products; in radial, perpendicular relation to the direction of flow of the combustion products; in radial and tangential relation to the direction of flow of the combustion products to produce a swirl pattern within the flow of the combustion products; or in oblique, countercurrent relation to the direction of flow of the combustion products.

In another preferred embodiment, the above described method can be combined with a method by which fuel is burned with an oxidant in a manner creating a higher $NO_2/NO_x$ ratio than in usual combustion processes. Subsequently, the flue gases from the combustor are post-treated in a wet scrubber where an effective removal of $NO_2$ can be achieved due to its high solubility in aqueous solutions. The remaining molecules of $NO_x$ produced in very little proportions in the combustor, are exhausted, allowing an overall very low level of $NO_x$ emissions in the atmosphere. This hybrid low $NO_x$ technology, based on a combination of combustion and post-combustion $NO_x$ reduction systems, provides a cost-effective alternative for systems requiring ultra-low levels of $NO_x$ emissions.

Whereas in usual combustion systems $NO_2$ accounts for between 5 and 10 percent of total $NO_x$ emissions (with NO accounting for the reminder), this method provides a combustion system design allowing not only an overall reduction of $NO_x$ emissions but also a reversion of the $NO/NO_2$ ratio, through the conversion of most of the NO into $NO_2$, inside of the combustion chamber. This way, the global amount of $NO_x$ generated is already reduced at the combustion level, and the remaining $NO_x$ is in a preferred form, easily captured downstream of the process. Indeed, $NO_2$ gas has fairly high solubility and reactivity to water and in aqueous solutions or alkalis as compared with NO, and can be removed fairly easily by wet scrubbing. Thus, the method includes combustion control to create conditions where the hot combustion gases generated at the burner level can be cooled rapidly by turbulent mixing with cold air. In these conditions, most of the NO generated in the flame can be converted to $NO_2$ (up to about 100%) and maintained in this form until the exit of the combustion process.

This turbulent mixing is practically achieved through a particular method of oxidant staging: a first portion of the oxidant required to burn a given amount of fuel is actually injected along with this fuel at the burner level, whereas the balance of oxidant required for complete combustion is injected in a manner allowing mixing with hot combustion products downstream of the flame front region. By mixing this secondary oxidant with hot combustion gases in a region where temperature is already reduced, a significant part of the NO gets converted into $NO_2$. One method of performing oxidant staging is disclosed in already issued patents: U.S. Pat. Nos. 5,302,111, 5,522,721 and 4,846,665.

Oscillating combustion involves the forced, out-of-phase oscillation of the fuel and/or oxidant flow rate(s) provided to a burner to create successive fuel-rich and fuel-lean zones within the flame. These oscillations actually increase heat transfer by enhancing flame luminosity and turbulence, and retard $NO_x$ formation by avoiding stoichiometric combustion. If the combustion chamber is designed in a preferred manner, these oscillations can create all the conditions required for almost complete conversion of the already low level of NO into $NO_2$: at the end of the combustion chamber, the hot gases from the fuel-rich zone eventually mix turbulently with the gases from the previous fuel-lean zone, containing mainly substantially cold air if conditions are lean enough. The phenomenon is even enhanced in the case of oscillating combustion since the fuel-rich periods are generating an additional supply of radicals and unburnt species (CO, $H_2$ and hydrocarbons), which is particularly favorable for higher $NO_2$ formation.

At the exit of such a combustion chamber, $NO_x$ are already reduced by at least 30% compared to a conventional combustion system, and even preferably by at least 50%. With a preferred tuning of the oscillating combustion parameters, these $NO_x$ are also composed mainly of NO2 (i.e., $NO_2/NO_x$ ratio above 50%), the $NO_2/NO_x$ ratio being preferably higher than 80%, and even more preferably about 100%.

This $NO/NO_2$ repartition provides a dramatic advantage for post-treatment over conventional combustion systems where the majority of the $NO_x$ generated is in the form of NO. In these cases, as already explained previously, very costly catalysts and reagents (Ammonia, ozone, precious metals . . . ) have to be used in order to either reduce NO to $N_2$ or oxidize NO to $NO_2$, which can then be readily captured. In the context of the invention, most of the $NO_x$ are exhausted in the form of $NO_2$, which limits the post-treatment to a unique and less expensive scrubbing step.

The advantage of this unique invention is actually to combine two cost-effective $NO_x$ reductions systems, which taken alone could not achieve very low $NO_x$ levels, but when combined, are able to compete with the most-effective ultra-low $NO_x$ technologies, at a reduced cost.

Figure 8:
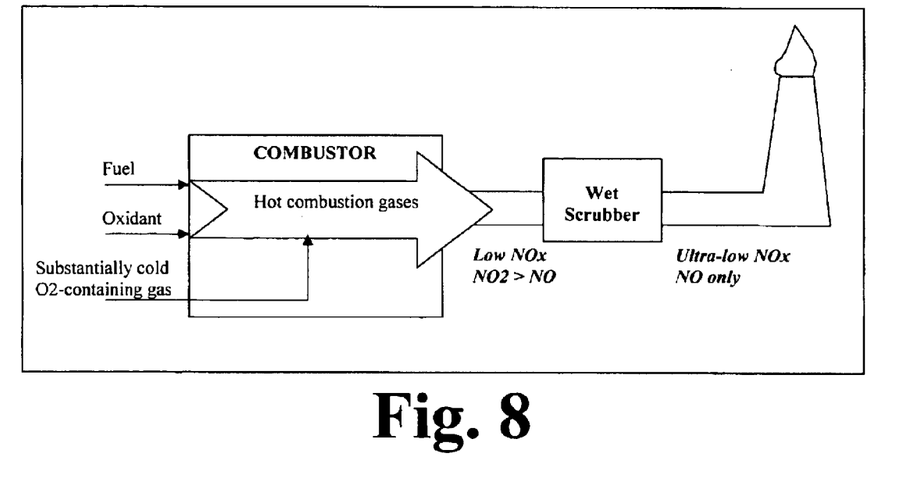
FIG. 8 is a schematic illustration of a preferred embodiment of hybrid combustion/post-treatment $NO_x$ reduction.

As shown in FIG. 8, fuel is injected in a combustion chamber of a process, through one or more burners, along with an oxidant in order to generate hot combustion gases and heat to be transferred to the load. Thus, an additional supply of substantially cold $O_2$-containing gas downstream of the flame front region is provided. By creating a turbulent mixing of this additional cold gas with the hot combustion gases resulting from the combustion region, a significant portion of the NO created in the flame can be converted into $NO_2$.

This phenomenon can be explained by taking a look at the physical mechanisms by which $NO_2$ is produced. Using a combustion chemical kinetics mechanism with 29 gas phase reactions, it is found that $NO_2$ is formed and destroyed by the following reactions:

Reaction of Formation $$NO+HO_2=NO_2+OH \tag{1}$$

Reactions of Destruction $$NO_2+H=NO+OH \tag{2}$$

$$NO_2+O=NO+O_2 \tag{3}$$

According to this mechanism, it appears that the quenching of the combustion gases by the cold $O_2$-containing gas has two effects. First, the $NO_2$ formation reaction may occur more readily, because quenching may result in a more abundant supply of the HO2 radicals, since reactions, other than (1) above, which use up $HO_2$ do not proceed below a threshold temperature. Second, quenching the hot combustion gases "freezes" the $NO_2$, viz., the destruction reactions (2) and (3) above, do not proceed because the temperature is below a critical threshold value.

The supply of substantially cold $O_2$-containing gas can be provided in different ways. The most preferred method varies according to the combustion chamber design, the number of burners, the type of load and the temperature repartition in the chamber. It should be noted that FIG. 8 only illustrates the location of the mixing between the substantially cold gas and the hot combustion gases (downstream of the flame front); however, unlike what is shown in FIG. 8, the cold gas is not necessarily injected separately from the main oxidant. Some special injection patterns of the oxidant may allow the delayed mixing of part of this oxidant with the combustion gases. These particular injection patterns are described below.

A first method considered is the use of burners with high level of oxidant staging. If the mixing of the staged oxidant with the products of combustion takes place far enough from the burner, in a region where the temperature is already reduced compared to the flame temperature, a good NO to $NO_2$ conversion is expected. A second method to achieve this natural conversion of NO to $NO_2$ is by performing over-fire air, or injection of an oxidant downstream of the flame region, from a port different than the burner one. A third and preferred method is by implementing the technology of oscillating combustion, as referred to above and as more fully described in the references noted above and incorporated herein by reference.

Figure 9:
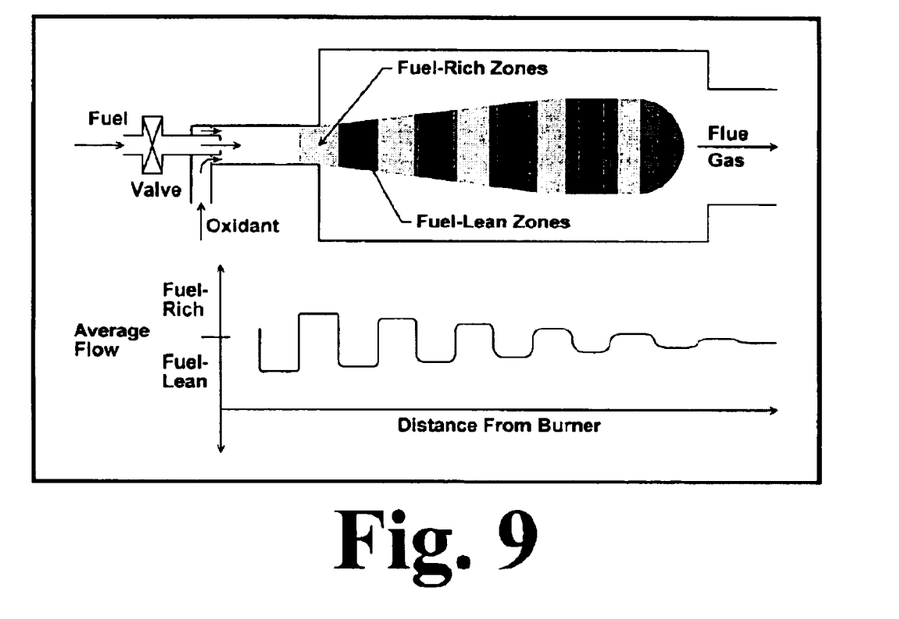
FIG. 9 is a schematic illustration of a preferred embodiment of an oscillating combustion method.

An objective of oscillating combustion is to create successive, $NO_x$ retarding, fuel-rich and fuel-lean zones within the flame. It involves forced oscillation of the fuel and/or oxidant flow rates provided to the burner. FIG. 9 describes schematically this concept, for a system involving only fuel flow rate oscillations. The level of $NO_x$ formed in each zone is significantly lower than that which would occur if the combustion took place without fuel oscillation but at the same overall average fuel flow rate because in the oscillating case the combustion is achieved off-stoichiometry, thus at reduced temperature. When the fuel-rich and fuel-lean zones eventually mix in the furnace, after heat has been transferred from the flame to the load and the flame temperature is lower, the resulting burnout of combustible gases occurs with little additional $NO_x$ formation. Additionally, the increased flame luminosity resulting from the fuel-rich combustion zones combined with the increased turbulence created by the flow oscillations provide increased heat transfer to the furnace load. To achieve these results, the technology only requires that an oscillating valve package (valve+pulse controller) be installed on the fuel and/or oxidant supply line ahead of each burner. Thus, with minimal modifications to an existing combustion systems (compared to retrofits required by a staged burner or an over-fire air system) and if the combustion chamber design is appropriate (residence time, wall temperature . . . ), the above described conditions required for NO–$NO_2$ conversion are perfectly met: in the region near the chamber exit, if the amplitude and frequency of the oscillations are adapted, the hot gases from the fuel-rich zone eventually mix with the gases from the previous fuel-lean zone. Since the air/fuel ratio is so far from the stoichiometry in this fuel-lean zone, barely any combustion occurs, thus keeping the oxidant at fairly low temperature. When the two zones eventually mix, the oscillations allow a turbulent mixing of hot combustion gases containing NO and substantially cold $O_2$-containing gas, thus guaranteeing efficient NO to $NO_2$ conversion. The phenomenon is even enhanced in the case of oscillating combustion since the fuel-rich periods are generating an additional supply of radicals and unburnt species (CO, $H_2$ and hydrocarbons), resulting in higher levels of the $HO_2$ radical which in turn results in higher levels of $NO_2$ formation.

A preferred combustion chamber configuration for the implementation of the oscillating combustion in the frame of this invention is a single-burner system, natural gas-fired where the load and the heat release rate create reduced wall and chamber exit temperatures. In this single-burner configuration, the amount of CO generated during fuel-rich oscillations does not usually have time to be burnt out by gases from fuel-lean zones. To keep CO emissions below regulated levels, a preferred solution is to implement a post-combustion system involving a recirculation zone positioned proximate to the main combustion zone and an injection zone positioned downstream from the recirculation zone, as described herein.

With such a system, flue gases exiting the combustion chamber not only contain reduced levels of $NO_x$ compared to a conventional burner system, but the ratio $NO_2/NOx$ is also much higher than in prior art low $NO_x$ systems. This aspect is of great advantage since it provides the opportunity to combine this first combustion control technique with a simple and cost-effective post-treatment $NO_x$ removal system, such as a wet scrubbing system, as shown in FIG. 8. Any other system can also be implemented to remove the remaining NO and $NO_2$ in the flue gas, but a preferred embodiment of this invention promotes the use of a system designed to capture only the $NO_2$ generated during the combustion and not to oxidize or reduce the remaining NO into $N_2$ or into a soluble species.

A preferred system to remove the $NO_2$ is a wet chemical scrubber using reagents such as NaOH (sodium hydroxide) and/or NaHS (sodium hydrosulfide) and/or $Na_2S$ (sodium sulfide). Other types of reagents can also be considered with different designs as far as packed bed depths, column velocities, recirculation rates, etc. A system based solely on water scrubbing is also possible, provided that enough room is available around the combustor to install such a large unit. But whatever the exact design selected, the unique advantage of this invention is to be able to remove almost all the $NO_x$ from the flue gas without the use of expensive reagents and catalysts like precious metals, ozone or ammonia usually required for the removal of NO. In a preferred configuration, this invention must allow a $NO_x$ reduction after the combustor of at least 30%, more preferably at least 50% and even more preferably at least 60%. The $NO_2/NO_x$ ratio of this remaining amount of $NO_x$ should be at least 50%, preferably higher than 80% and even more preferably up to about 100%.

By using a post-treatment system able to capture almost all of the $NO_2$, it can then be concluded that this technology can reduce by close to 100% $NO_x$ emissions from certain favorable combustion processes. Preferably, this technology is able to reduce by at least 80% $NO_x$ from a conventional system, and to bring overall $NO_x$ emissions preferably below 10 ppm.

Oscillating combustion has been implemented in a 1 MWt natural gas fired firetube boiler, along with a post-combustion system to avoid the emission of large amounts of CO. The boiler was equipped with an already low-$NO_x$ swirl-type burner. The burner was fired at a fuel flow rate of 2500 scfh and in the base case, without fuel oscillations, a $NO_x$ level of about 60 ppm (corrected at 3% $O_2$) was measured, among which 57 ppm was NO. After installation of the fuel oscillating valve, the burner was fired at the same firing rate in average, but with fuel oscillations of various amplitudes and frequencies. With an amplitude of the oscillations at 70% (i.e., maximum fuel flow rate at 170% of average flow rate and minimum flow rate at 30% of the average flow) and a frequency of 1 Hz (1 fuel-rich zone and 1 fuel-lean zone generated every second), the $NO_x$ reduction achieved was about 53%, with a NO level of about 5 ppm (at 3% O2) and $NO_2$ at about 22.5 ppm. By implementing a wet chemical $NO_2$ scrubber in the flue gas exhaust of this boiler, with a $NO_2$ removal efficiency of at least 95%, the final $NO_x$ level at the exit of the system described in this invention can be below 6 ppm, resulting in an overall $NO_x$ reduction of 90% compared to the baseline achieved by a conventional low-$NO_x$ burner. Such levels of $NO_x$ removal can compete with the most advanced ultra low $NO_x$ technologies, including ultra low $NO_x$ burners or SCR systems, but with lower capital and operating costs due to the simplicity of the technical concepts involved.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for burning a fuel to produce a flue gas, the process comprising:

burning the fuel in a main combustion zone in the presence of a main combustion oxidant to produce combustion products;

mixing the combustion products in a post-combustion zone positioned downstream from the main combustion zone, the post-combustion zone having a recirculation zone positioned proximate to the main combustion zone and an injection zone positioned downstream from the recirculation zone;

injecting a post-combustion oxidant into the combustion products in the injection zone; and controlling at least one of (a) the residence time of the combustion products in the post-combustion zone, (b) the temperature range of the combustion products contained within the injection zone and (c) the oxygen content of the oxidant, to optimize the level of CO and $NO_x$ in the flue gas.

2. A process for burning a fuel to produce a flue gas, the process comprising:

burning the fuel in a main combustion zone in the presence of a main combustion oxidant to produce combustion products;

mixing the combustion products in a post-combustion zone positioned downstream from the main combustion zone, the post-combustion zone having a recirculation zone positioned proximate to the main combustion zone and an injection zone contained within the recirculation zone;

injecting a post-combustion oxidant into the combustion products in the injection zone; and controlling at least one of (a) the residence time of the combustion products in the post-combustion zone, (b) the temperature range of the combustion products contained within the injection zone and (c) the oxygen content of the oxidant, to optimize the level of CO and $NO_x$ in the flue gas.

3. The process of claim 1 wherein the temperature of the combustion products contained within the post-combustion zone is maintained between about 800° C. and about 1300° C.

4. The process of claim 3 wherein the temperature of the combustion products contained within the post-combustion zone is maintained between about 800° C. and about 1100° C.

5. The process of claim 1 wherein the post-combustion zone is provided with at least one baffle.

6. The process of claim 5 wherein the post-combustion zone is provided with a plurality of baffles.

7. The process of claim 6 wherein the baffles are oriented substantially perpendicular to the general direction of flow of the combustion products.

8. The process of claim 6 wherein the baffles are disposed in staggered relation to one another.

9. The process of claim 8 wherein the baffles are oriented substantially perpendicular to the general direction of flow of the combustion products.

10. The process of claim 1 wherein the post-combustion zone is provided with a diffuser.

11. The process of claim 1 wherein the post-combustion oxidant is injected into the combustion products in axial, countercurrent relation to the direction of flow of the combustion products.

12. The process of claim 1 wherein the post-combustion oxidant is injected into the combustion products in radial, perpendicular relation to the direction of flow of the combustion products.

13. The process of claim 1 wherein the post-combustion oxidant is injected into the combustion products in radial and tangential relation to the direction of flow of the combustion products to produce a swirl pattern within the flow of the combustion products.

14. The process of claim 1 wherein the post-combustion oxidant is injected into the combustion products in oblique, countercurrent relation to the direction of flow of the combustion products.

15. The process of claim 1 wherein the post-combustion oxidant is injected into the combustion products at an average velocity of between about 5 meters per second and about 120 meters per second.

16. The process of claim 1 wherein the post-combustion oxidant is injected into the combustion products with at least one lance.

17. The process of claim 1 wherein the post-combustion oxidant is injected in the combustion products in a staged relation to the direction of flow of the combustion products.

18. The process of claim 1, wherein the stoichiometric amount of oxygen contained in the main oxidant is between about 0.7 and 1.0 of the amount necessary for complete combustion.

19. The process of claim 1 wherein the total oxygen composition of the post-combustion oxidant entering the oxidant chamber exceeds 21%.

20. The process of claim 19 wherein the total oxygen composition of the post-combustion oxidant entering the oxidant chamber is between 21% and 35%.

21. The process of claim 1 wherein a heat-absorbing material is injected into the main combustion zone during the burning to reduce the temperature of the combustion products within the combustion zone.

22. The process of claim 1 wherein the burning is conducted by oscillating combustion process techniques.

23. The process of claim 18 wherein the burning is conducted by oscillating combustion process techniques.

24. The process of claim 20 wherein the burning is conducted by oscillating combustion process techniques.

25. A process for burning a fuel to produce a flue gas, the process comprising:

burning the fuel in a main combustion zone in the presence of a main combustion oxidant to produce combustion products;

mixing the combustion products in a post-combustion zone positioned downstream from the main combustion zone, the post-combustion zone having a recirculation zone positioned proximate to the main combustion zone and an injection zone positioned downstream from the recirculation zone;

the post-combustion zone being provided with at least one of a diffuser or a plurality of baffles oriented substantially perpendicular to the general direction of flow of the combustion products and being disposed in staggered relation to one another;

maintaining the temperature of the combustion products contained within the post-combustion zone between about 800° C. and about 1100° C.;

injecting with at least one lance a post-combustion oxidant into the combustion products in the injection zone at an average velocity of between about 5 meters per second and about 120 meters per second;

maintaining the stoichiometric amount of oxygen contained in the main oxidant to be between about 0.7 and 1.0 of the amount necessary for complete combustion;

maintaining the total oxygen composition of the post-combustion oxidant entering the oxidant chamber to be between 21% and 35%;

injecting a heat-absorbing material into the main combustion zone during the burning to reduce the combustion temperature within the combustion zone;

conducting the burning by oscillating combustion process techniques; and controlling at least one of (a) the residence time of the combustion products in the post-combustion zone, (b) the temperature of the combustion products contained within the injection zone and (c) the oxygen content of the oxidant, to optimize the level of CO and $NO_x$ in the flue gas.

26. The process of claim 25 wherein the post-combustion oxidant is injected into the combustion products in axial, countercurrent relation to the direction of flow of the combustion products.

27. The process of claim 25 wherein the post-combustion oxidant is injected into the combustion products in radial, perpendicular relation to the direction of flow of the combustion products.

28. The process of claim 25 wherein the post-combustion oxidant is injected into the combustion products in radial, offset relation to the direction of flow of the combustion products to produce a swirl pattern within the flow of the combustion products.

29. The process of claim 25 wherein the post-combustion oxidant is injected into the combustion products in oblique, countercurrent relation to the direction of flow of the combustion products.

30. A process for burning a fuel to produce a flue gas, the process comprising:

burning the fuel in a main combustion zone in the presence of a main combustion oxidant to produce combustion products;

mixing the combustion products in a post-combustion zone positioned downstream from the main combustion zone, the post-combustion zone having a recirculation zone positioned proximate to the main combustion zone and an injection zone positioned downstream from the recirculation zone;

injecting a post-combustion oxidant into the combustion products in an injection zone positioned downstream from the main combustion zone; and combusting the combustion products with the post-combustion oxidant, thereby optimizing the levels of CO and $NO_x$ in the flue gas.

31. A process of retrofitting a boiler comprising a combustion apparatus having a main combustion zone configured for burning fuel in the presence of a main combustion oxidant to produce combustion products, the process comprising:

providing a mixing device downstream of the main combustion zone positioned and configured to increase a residence time of the combustion products in a recirculation zone proximate to the main combustion zone in comparison to an absence of the mixing device;

providing an injection device positioned and configured to inject a post-combustion oxidant into the combustion products in the injection zone, thereby facilitating combustion of the combustion products and the post-combustion oxidant such that levels of CO and $NO_x$ resulting therefrom are optimized.

* * * * *